Nov. 27, 1928.
C. HEDDON
1,692,935
ARTIFICIAL BAIT
Filed Sept. 15, 1926    2 Sheets-Sheet 1
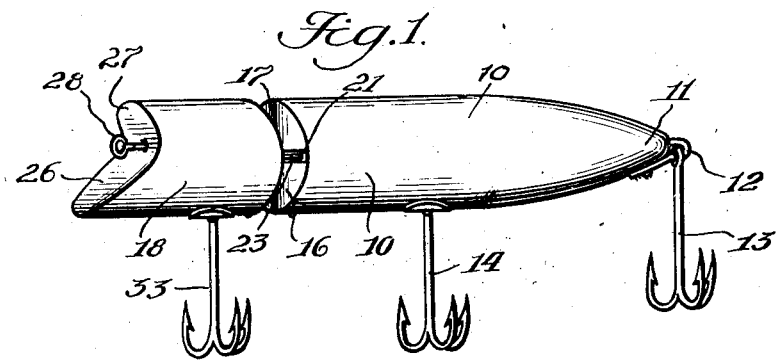
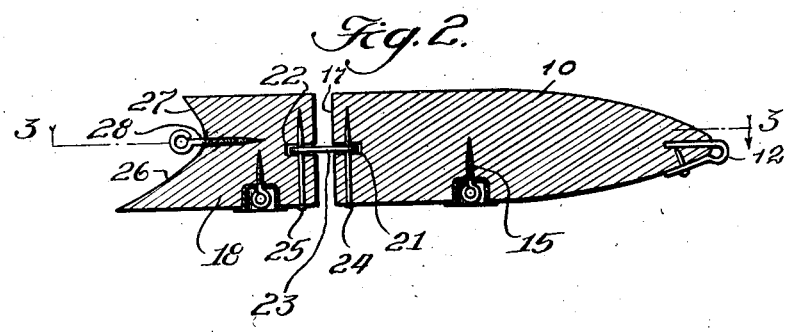
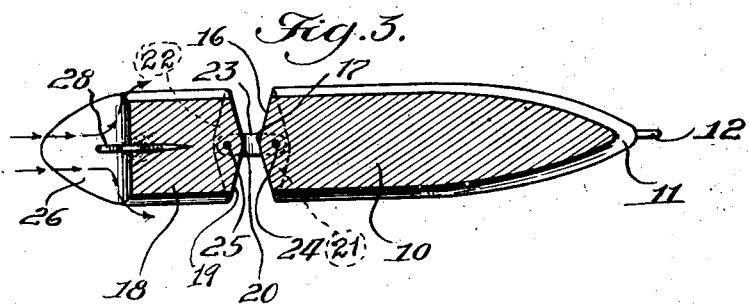
Inventor
Charles Heddon
By Banning Banning
Attys Nov. 27, 1928.  
C. HEDDON  
1,692,935  
ARTIFICIAL BAIT  
Filed Sept. 15, 1926  
2 Sheets-Sheet 2
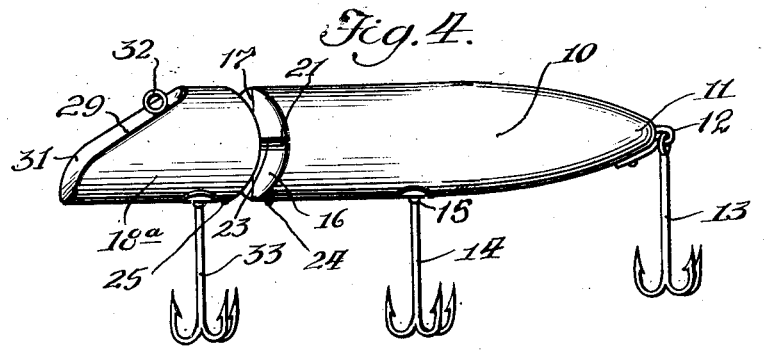
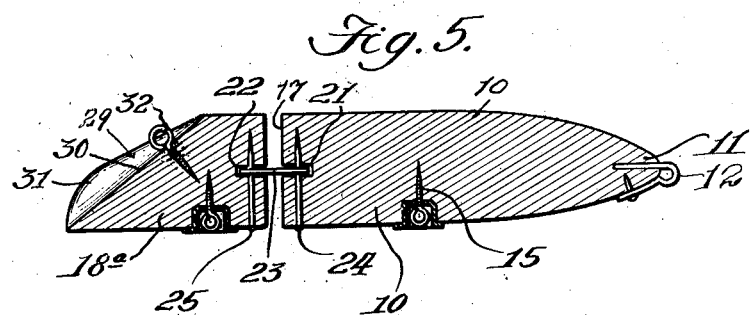
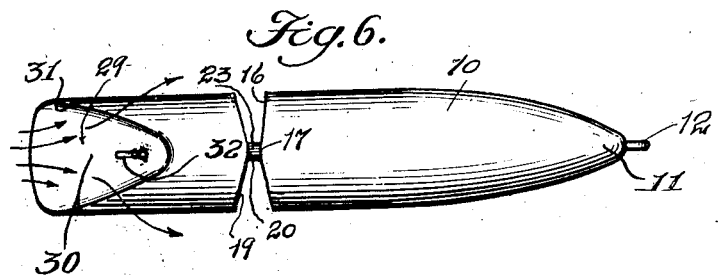
Inventor  
Charles Heddon  
By Banning & Banning  
Attys Patented Nov. 27, 1928.

1,692,935

UNITED STATES PATENT OFFICE.

CHARLES HEDDON, OF DOWAGIAC, MICHIGAN, ASSIGNOR TO JAMES HEDDON'S SONS, OF DOWAGIAC, MICHIGAN, A CORPORATION OF MICHIGAN.

ARTIFICIAL BAIT.

Application filed September 15, 1926. Serial No. 135,505.

Among makers and users of artificial wooden baits, which are commonly employed in the luring of fresh water game fishes, it has long been the aim and purpose to provide a frontal structure for the bait of such character as to impart erratic lateral or fluttering and darting movements which, by their erratic or fluttering character, not only better serve to attract the attention of game fishes, but also arouse the interest and attention of the fisherman and increase the attractiveness of the sport. It has also been the practice in some instances to provide one or more joints or articulations in the bait for the purpose of simulating the movements of a swimming minnow, and this type of bait has met with considerable favor.

The object of the present invention is to construct a bait which will not only combine the swimming and erratic or fluttering movements heretofore separately provided for in different types of bait, but also to so construct the bait that the side to side or lateral erratic or fluttering movements will be more frequent, abrupt and erratic and fluttering in character than has heretofore been the case in solid or unjointed baits, and, at the same time, add the flexing feature, so that in the present bait the two forms of motion will be combined and superposed one upon the other with the result that a much greater attractive and lively effect will be produced than has heretofore been the case in any bait with which I am familiar.

The bait consists essentially of a body portion which serves as a mounting for a head portion having a frontal structure which so utilizes the pressure or impact of the water as to develop the erratic movements, with the parts so configured, proportioned and arranged as to permit the motive effect of the head portion to be properly stabilized by the body portion and utilized and transmitted to the body portion in proper degree to best subserve the object in view.

Further objects and details will appear from the description of the invention in connection with the accompanying drawings.

In the drawings:

Figure 1 is a perspective view of the present bait showing one of the modifications thereof;

Fig. 2 is a longitudinal sectional elevation through the center of the bait;

Fig. 3 is a sectional plan view taken on line 3—3 of Fig. 2;

Fig. 4 is a perspective view of the present bait showing another modification;

Fig. 5 is a longitudinal sectional view through the center of the bait of Fig. 4; and Fig. 6 is a top or plan view of the bait of Fig. 4.

In the two modifications here illustrated by way of exemplification, the body portion 10 in each case is identical, differences in structure being confined to the head portion. The body portion tapers toward its rear end 11, and preferably terminates in a rear eye 12 for the attachment of a rear hook gang 13, and also makes provision for the attachment of a forward body gang 14, which latter is attached to an eye 15 entered into the rear portion of the body near the center thereof. The body terminates abruptly at its forward end, the forward faces 16 of the body being tapered forwardly toward the medial ridge 17 to provide clearance for a lateral or swimming movement of the body with respect to the head portion of the bait.

In the bait of Figs. 1, 2 and 3, the head portion 18 at its rear end is of a size to constitute a continuation of the adjacent front portion of the body and, as shown in Fig. 3, the rear end faces 19 of the head portion converge toward a center ridge 20 in opposed relation to the center ridge 17 of the body, the parts being suitably spaced to permit considerable freedom of movement with respect to one another. The body section is provided with a cross groove 21 and the head section with a similar cross groove 22, which grooves in conjunction afford recesses for the reception of the ends of a flat link 23, the ends of which are pivoted on vertically extending pins 24 and 25, which arrangement affords a lateral hinging of the parts, and, at the same time, permits a slight freedom of vertical movement in a much more restricted degree.

The head 18, in the form shown in Figs. 1, 2 and 3, is configured on its front face to afford an upwardly and rearwardly sloping lower impingement surface 26 for the water which terminates above the longitudinal center plane of the bait and merges into a forwardly and upwardly extending overhanging lip 27 which, in conjunction with the lower impingement area, provides a transversely extending open ended cross water channel for the lateral discharge of the water, which is diverted rearwardly into the channel by the conjoint action of the two converging front surfaces when the bait is being retrieved, and tends to find its escape laterally from the ends of the channel on opposite sides of the head portion of the bait.

The line tie 28 is located above the longitudinal center plane and at the center laterally of the cross channel which point, in this instance, constitutes the center of balance for the bait, by which term I mean, the point at which a forward tension on the line in retrieving will impart a balanced effect to the bait both laterally and vertically without tending to cause a preponderant movement in any particular direction, so that if the line tension and water resistance remain exactly constant (which they never do), the bait would travel freely behind the line without lateral or vertical movement in any direction. However, in actual use, the line tension and water resistance are constantly varying and indeterminate elements in all directions, so that the bait will travel in a state of unstable equilibrium and rapid and seemingly erratic or fluttering movements will be developed in a manner presently to be described.

In the bait shown in Figs. 4, 5 and 6, the head 18$^a$ is substantially the same size in relation to the body as that previously described, but the frontal structure of the head, which constitutes the motive portion thereof, is differently configured. In the head of Figs. 4, 5 and 6, the forward end of the head is provided with an obliquely disposed upwardly and rearwardly extending open ended rounded groove or channel 29, the medial portion or base 30 of which extends in a straight oblique line from front to rear, and a groove of this character, cut obliquely through the cylindrical head portion will afford side lips or walls 31 of progressively increasing depth toward the bottom of the bait, which gives to the forward end of the bait a scoop shaped configuration. The line tie 32, in this case, is located within the oblique groove 29 near the upper end thereof and above the longitudinal center of the bait, and in this instance also the line tie is located at the center of balance with the result that if the bait were subjected to a constantly uniform pressure, it would trail evenly behind the line with no preponderant tendency to move laterally in either direction. The head section 18 or 18$^a$, as the case may be, is provided with a head hook gang 33 which not only subserves its customary function, but also serves as a ballast to stabilize the head section and maintain its frontal structure in proper relation to the water which is necessary in order that the impinging or pressure effect of the water may be properly directed against the head of the bait.

In use, with either form of bait, the front structure is configured in such a way as to be delicately responsive to variations in the direction of the water pressure developed during the passing of the bait through the water while retrieving. The buoyancy of the bait in conjunction wth the natural configuration of the head and its relation to the body is a factor in influencing this delicacy in action, which in considerable measure is dependent on the proportion of the mass of the bait to its area of impact. By locating the line tie in the center of balance in each instance, and by preferably making the head of less mass and size than the body, and by joining the body and head in the manner indicated, the slightest variation in direction of water pressure will be reflected in a lateral turning and slight rolling of the head and a tendency for the head to dart laterally in an erratic manner. If the tendency for the head to move in a given direction continues, it will be imparted in a greater or less degree to the more massive body which will result in a lateral movement of the bait as a whole, but if the lateral impetus imparted to the head be slight, it may result in a rapid back and forth movement confined mainly to the head and but slightly imparted to the body.

As a result of these conditions, the bait as it moves through the water will develop two distinct movements, one of which will be confined to the head and the other imparted in greater or less degree to the body, with the result that the bait as a whole will dart from side to side within a considerable range of action, and the head will respond independently to numerous slight movements which result in a wiggling or swimming of the bait resembling the natural movements of a minnow, but the extent, character and sequence of the movements will constantly vary in response to slight variations in the pressure conditions, so that a highly erratic or fluttering and attractive movement will result.

The position of the joint and the relation in mass of the head to the body may be varied within suitable limits, but with a corresponding variation in the character of the resulting movements. If the head is made short in relation to the length of the body, the erratic wiggling or fluttering head movement will be proportionately increased, while if the head is made longer in proportion to the body, the erratic or fluttering head movement will be lessened and the amplitude of the side to side movement of the bait as a whole will be increased, as will also the power of the head to whip the tail. However, it is desirable to provide the head with sufficient weight, substance or mass to maintain it reasonably stable when subjected to the pressure of the water, so that by its acquired momentum in a given direction, it will serve to laterally deflect the forward end of the more ponderous body in order to advantageously combine the head and body movements in the manner indicated.

Moreover, the formation of the frontal structure which receives the impact of the water must be such as to provide neither too much nor too little obstruction to the water pressure, and in order to utilize the water pressure in such a way as to insure sharp and erratic side wise darting movements, it is desirable that the front of the head be configured in such a way as to involve a departure from a truly planate surface, so that some portion of the head structure will afford a delicate obstruction to the escaping water with the result that in relieving itself from the effects of such obstructing influence, the bait will be subjected to a lateral and rolling thrust either in one direction or the other which is required in order to throw the bait out of its normal condition of unstable equilibrium. In the formation of the frontal surface not only must the effect of the water on such surface be considered, but also the effect of the escaping water on the sides and top of the body with due regard to the lateral surface presented when the bait is submerged by the tension of the line in retrieving, as well as surface conditions developed as a result of the angling of the body in various directions due to variable conditions.

In each of the forms described, it will be observed that the head section terminates in an obliquely disposed front face having formed across a portion thereof a straight cut definitely defined groove constituting an open ended cross water channel with walls extending forwardly from the base of the channel and so disposed as to receive the impact of the escaping water at points laterally removed from the center, so that variations in the pressure of the escaping water, which is directed through the channel, will act variably on these laterally disposed surfaces in such a way as to turn the head of the bait laterally and roll the bait on its longitudinal axis, and when the bait is thus initially deflected, the oblique disposition of the frontal surface as a whole will cause a sharp and erratic darting movement of the character indicated.

In the baits of Figs. 1, 2 and 3, the water escaping laterally through the cross channel will exert a variable upward impingement against the under side surfaces of the overhanging lip 27, which variable impingement will tend to roll the bait in such a way as to deflect the obliquely disposed area of impact to one side or the other of the draft line, thus initiating the movement in question.

In the bait of Figs. 4, 5 and 6, the base of the channel lies tangent to an oblique plane, but, in this instance, the side lips lie in advanced relation with respect to the corresponding base portions of the channel, so that inequality in the lateral pressure exerted against the side lips will result in a rolling of the bait and an unequal presentation of the front face to the line of draft, with results similar to those already described.

In the bait of Figs. 1, 2 and 3, the water impinging against the front of the bait will be directed in converging lines into the cross channel by reason of the obstruction afforded to its free upward escape by the overhanging lip 27. The water will be diverted toward opposite ends of the channel, and if conditions remain stable, such diversion would be equally distributed in opposite directions. However, by reason of the extreme buoyancy and the delicate balancing of the bait, due to the attachment of the line tie at the center of balance, and by a slight turning or rolling movement of the head with respect to the longitudinal axis of the bait, the equal diversion of the water will be disturbed at frequent intervals, so that it will tend to escape more freely on one side than the other with a resulting reaction against the head of the bait to cause an erratic movement from side to side.

In the case of the bait shown in Figs. 4, 5 and 6, the water escaping obliquely through the front channel will tend to exert an unequal thrust on the opposing side walls of the channel afforded by the forwardly protruding side lips 29, and the inequality in the direct side thrust of the water against these surfaces, combined with the slight rolling movements of the head, will cause a preponderance of pressure toward one side or the other which will result in the erratic side movements heretofore mentioned.

While one of the baits has a broader surface of resistance to the reaction of the escaping water, the other has a more acute angle of resistance to the reaction of the escaping water, the result in either case is substantially the same and either form of bait will respond to the slightest inequality in conditions while, if the bait were solid, it would not produce the sharp and violent reaction. That is to say, if the bait were incapable of sidewise movement save in response to a lateral pressure sufficient in degree to move the entire bait, the quick, active, fluttering or intermittent movements which distinguish the present bait would disappear, and the bait as a whole would respond only to the more extreme variations and would, at the same time, lose all of the action due to the bending or flexing of the bait sections in simulation of the body motions of a swimming minnow.

By proportioning the head and body sections substantially in the manner indicated, the head is made quickly responsive to infinitesimal changes in water pressure conditions, and, at the same time, possesses sufficient mass to turn or flex the forward end of the body in response to lateral momentum acquired by the head, while at the same time the body possesses sufficient mass to hold the head in proper relation to receive the impact of the water and function in the manner described. The bait as a whole constitutes a unified structure in which the various parts are combined or co-ordinated in order to best utilize the power developed by the escape of the water in the development of a series of individual erratic or fluttering movements, which are superadded to or compounded with the side to side motions of the bait as a whole, so that the bait will cover a considerable lateral range, which is desirable, and at the same time greatly increase the number and variability of the individual movements which give life and action to the bait.

I claim:

1. A bait consisting of a head section having a non-planate frontal surface configured to provide a channel for the escape of the water and having opposed walls positioned to receive inequalities in lateral pressure of the escaping water in imparting lateral movements to the head, and a body having flexible relation to the head and connected to swing laterally with respect thereto, the body being rigid and having a greater mass than the head, substantially as described.

2. A bait consisting of a head section having a non-planate frontal surface configured to provide a channel for the escape of the water and having opposed walls positioned to receive inequalities in lateral pressure of the escaping water from the channel in imparting lateral movements to the head, a rigid body having flexible connection to the head and connected to swing laterally with respect thereto and being rigid and having a greater mass than the head, and a line tie secured to the front surface of the head at the point of balance thereof, substantially as described.

3. A bait consisting of a head section having a non-planate frontal surface configured to provide a channel for the escape of the water and having opposed walls positioned to receive inequalities in lateral pressure of the escaping water from the channel in imparting lateral movements to the head, a body having flexible connection to the head and connected to swing laterally with respect thereto, the body being rigid and having a greater mass than the head, a line tie secured to the front surface of the head at the point of balance thereof, and a hook secured to and depending from the head to ballast the head, substantially as described.

4. A fish bait consisting of a body portion and a head portion, a connection between said portions for permitting lateral movement, the front of the head being formed with a sloping front surface for receiving the impact of the water and havng in conjunction with said front surface an obstructing surface extending at an angle thereto, said surfaces in conjunction acting to utilize pressure of the escaping water in such a way as to impart erratic lateral and rolling movements to the head, the body being rigid and of substantially greater length and greater mass than the head, and a hook secured to and depending from the head and serving to ballast the head, substantially as described.

5. A fish bait consisting of a body portion and a head portion, a connection between said portions for permitting lateral movement, the front of the head being formed with a sloping front surface for receiving the impact of the water and having in conjunction with said front surface an obstructing surface extending at an angle thereto, said surfaces in conjunction acting to utilize pressure of the escaping water in such a way as to impart erratic lateral and rolling movements to the head, the body being rigid and of substantially greater length and greater mass than the head, a hook secured to and depending from the head and serving to ballast the head, and a line tie secured to the front face of the head at the center of balance thereof, substantially as described.

6. In a bait, the combination of a body section and a head section in jointed relation to one another, the head section having an upwardly and rearwardly obliquely disposed face providing an area of impact extending to a line above the longitudinal center plane of the bait and an upwardly and forwardly extending lip merging with the area of impact and providing a cross channel for the lateral discharge of water for imparting erratic lateral movements to the head section, the body section being rigid and of substantially greater length and mass than the head section, substantially as described.

7. In a bait, the combination of a body section and a head section in jointed relation to one another, the head section having a bifurcated front face comprising an upwardly and rearwardly obliquely disposed surface providing an area of impact extending to a line above the longitudinal center plane of the bait and merging into an upwardly and forwardly extending lip furnishing in conjunction with the area of impact a cross channel for the lateral discharge of water for imparting erratic lateral movements to the head section, and a line tie secured at the center of balance of said cross channel, the body section being rigid and of substantially greater length and mass than the head section, substantially as described.

8. In a bait, the combination of a body section and a head section in jointed relation to one another, the head section having an upwardly and rearwardly obliquely disposed face providing an area of impact extending to a line above the longitudinal center plane of the bait and merging into an upwardly and forwardly extending lip furnshing in conjunction with the area of impact a cross channel for the lateral discharge of water for imparting erratic lateral movements to the head section, the body section being rigid and of substantially greater length and mass than the head section, and a hook secured to and depending from the head section and serving to ballast the same, substantially as described.

9. In a bait, the combination of a body section and a head section in jointed relation to one another, the head section having an upwardly and rearwardly obliquely disposed face providing an area of impact extending to a line above the longitudinal center plane of the bait and merging into an upwardly and forwardly extending lip furnishing in conjunction with the area of impact a cross channel for the lateral discharge of water for imparting erratic lateral movements to the head section, a line tie secured at the center of balance of said cross channel, a body section being rigid and of substantially greater length and mass than the head section, and a hook secured to and depending from the head section and serving to ballast the same, substantially as described.

CHARLES HEDDON.